United States Patent
Hirosawa

(10) Patent No.: US 8,141,000 B2
(45) Date of Patent: Mar. 20, 2012

(54) DESTINATION RETRIEVAL APPARATUS, COMMUNICATION APPARATUS AND METHOD FOR RETRIEVING DESTINATION

(75) Inventor: Takayuki Hirosawa, Tochigi (JP)

(73) Assignee: Panasonic Corporation, Osaka (JP)

( * ) Notice: Subject to any disclaimer, the term of this patent is extended or adjusted under 35 U.S.C. 154(b) by 1388 days.

(21) Appl. No.: 11/183,983

(22) Filed: Jul. 19, 2005

(65) Prior Publication Data

US 2006/0050325 A1 Mar. 9, 2006

(30) Foreign Application Priority Data

Sep. 8, 2004 (JP) ............................... P2004-261190
Nov. 25, 2004 (JP) ............................... P2004-339818

(51) Int. Cl.
*G06F 3/048* (2006.01)

(52) U.S. Cl. ......... 715/829; 715/817; 715/830; 715/831

(58) Field of Classification Search .......... 701/200–224; 340/988–996
See application file for complete search history.

(56) References Cited

U.S. PATENT DOCUMENTS

| | | | | | |
|---|---|---|---|---|---|
| 5,059,965 | A | * | 10/1991 | Geiser | 340/995.23 |
| 5,471,392 | A | * | 11/1995 | Yamashita | 701/200 |
| 5,635,953 | A | * | 6/1997 | Hayami et al. | 715/855 |
| 5,668,640 | A | * | 9/1997 | Nozawa et al. | 358/434 |
| 5,718,520 | A | * | 2/1998 | MacKay | 400/61 |
| 5,825,306 | A | * | 10/1998 | Hiyokawa et al. | 340/988 |
| 6,038,508 | A | * | 3/2000 | Maekawa et al. | 701/207 |
| 6,484,094 | B1 | * | 11/2002 | Wako | 701/211 |
| 6,801,955 | B2 | * | 10/2004 | Dunlap et al. | 710/8 |
| 7,080,325 | B2 | * | 7/2006 | Treibach-Heck et al. | 715/780 |
| 7,130,743 | B2 | * | 10/2006 | Kudo et al. | 701/209 |
| 7,996,781 | B2 | * | 8/2011 | Zaliva | 715/762 |
| 2002/0122215 | A1 | * | 9/2002 | Watanabe | 358/474 |
| 2002/0126097 | A1 | * | 9/2002 | Savolainen | 345/168 |
| 2002/0144026 | A1 | * | 10/2002 | Dunlap et al. | 710/16 |
| 2003/0160828 | A1 | * | 8/2003 | Treibach-Heck et al. | 345/780 |
| 2004/0003095 | A1 | * | 1/2004 | Gitany-Alonso | 709/228 |
| 2004/0111475 | A1 | * | 6/2004 | Schultz | 709/206 |
| 2006/0044621 | A1 | * | 3/2006 | Ohhata et al. | 358/438 |
| 2006/0050325 | A1 | * | 3/2006 | Hirosawa | 358/400 |

FOREIGN PATENT DOCUMENTS

JP 2000-278501 10/2000
JP 2002-044341 2/2002

OTHER PUBLICATIONS

English language Abstract of JP 2002-044341.
English language Abstract of JP 2000-278501.

\* cited by examiner

*Primary Examiner* — Khoi Tran
*Assistant Examiner* — Bhavesh V Amin
(74) *Attorney, Agent, or Firm* — Greenblum & Bernstein, P.L.C.

(57) ABSTRACT

When an initial character is specified by striking a character input key, the first destination candidate, according to the alphabetical order, is displayed. After this, in response to each striking of the same character input key, the display screen is switched to displaying the next destination candidate. In particular, when there is no more next destination candidate having the character specified by the character input key as its initial character, the turn returns to the first destination candidate having the same character as its initial character and this destination candidate is displayed.

14 Claims, 8 Drawing Sheets

Fig.3

| Initial character | Order | Destination name | Dial number & e-mail address |
|---|---|---|---|
| A | A1 | ABC CORPORATION | 0120111111 |
| | A2 | AMANDO | amando@aaa.com |
| | A3 | ANDO TARO | taro_ando@com.com |
| B | B1 | BARBER AOKI | 9991111 |
| | B2 | BOOK STORE(TOKYO) | book_tokyo@pan.com |
| | B3 | BOOK STORE(YOKOHAMA) | book_yokohama@pan.com |
| ... | ... | ... | ... |
| Y | Y1 | YAMADA HANAKO | 12345678 |
| | Y2 | YOKOHAMA FAX SERVICE | 0123555555 |
| Z | Z1 | ZAMBIA MAIL | zambia_mail@bbb.com |
| | Z2 | ZZZ CORPORATION | 0-010-1-9876543210 |

DESTINATION RETRIEVAL APPARATUS, COMMUNICATION APPARATUS AND METHOD FOR RETRIEVING DESTINATION

BACKGROUND OF THE INVENTION

1. Field of the Invention

The present invention relates to a destination retrieval apparatus, a communication apparatus and a method for retrieving a destination. The destination retrieval apparatus displays candidates for a destination and lets a user select from the candidates a destination he/she needs. The communication apparatus is equipped with the destination retrieval apparatus, and specifies a destination by using the destination retrieval device and transmits data to the specified destination.

2. Description of Related Art

Transmission process is performed by inputting a destination dial number in the case of a G3 facsimile apparatus, and by inputting a destination e-mail address in the case of an Internet facsimile apparatus. In order to save such time-consuming effort as direct input of destination dial numbers or e-mail addresses, there have been facsimile apparatuses equipped with an electronic phonebook function, which allows a user to previously store a dial number or an e-mail address and a name for each destination, and to specify a destination dial number or a destination e-mail address by selecting the destination he/she needs from the destination names displayed on the display.

For facsimile apparatuses equipped with such an electronic phonebook function, when the number of destinations stored in the phonebook is large, it takes time to search the one destination the user needs. To reduce such search time, it is usual to adapt a configuration in which the number of candidates for a destination is narrowed down according to the initial characters of destination names. Other known configurations include the one where a character string inputted from a control panel is used as a key word to narrow down the number of the destinations shown on the display (see Related Art 1, for example), and the one where destinations are displayed according to a predetermined order based on, for example, the number of selections in the past, alphabetical order, number of transmission failures, distance, and the like (see Related Art 2, for example).

[Related Art 1] Japanese Laid Open Publication 2002-44341 (FIG. 11)

[Related Art 2] Japanese Laid Open Publication 2000-278501 (FIGS. 3 and 5)

However, as in the conventional technology described above, in the configuration of narrowing down the number of candidates for a destination based on a character string, the input of the character string is troublesome; and, in the configuration of displaying destinations according to a particular order, it is not always possible to quickly locate a destination the user needs by using the specified order, and there are drawbacks in the aspect of being easy to use. In the usual configuration of narrowing down the number of candidates according to the initial characters of destination names, the search condition used in the process of narrowing down the number of candidates is easy to understand and the method is easy to use.

However, in the configuration of narrowing down the number of candidates according to the initial characters of destination names, the number of candidates that match the search condition in the process of narrowing down the number of candidates is often large. When this happens, the Up key, Down key, and other keys are used to display the next candidate and find the destination that the user needs. In this case, after striking a key for specifying an initial character, which is used as the search condition in the process of narrowing down the number of candidates, it is necessary to strike a different key in order to display the next candidate; this is not satisfactory in the aspect of being easy to use.

SUMMARY OF THE INVENTION

The present invention is designed to solve the above-mentioned problems of conventional technology. The main purpose of the present invention is to provide a destination retrieval apparatus, a communication apparatus and a method for retrieving a destination. The destination retrieval apparatus has a configuration capable of reducing the burden associated with keystrokes in the destination retrieval process and thereby improving easiness to use. The communication apparatus is equipped with such a destination retrieval apparatus.

In order to achieve such an objective, the present invention includes a memory, an input unit, a display, and a controller. The memory stores for each destination information and a name, the information being required to perform communication via the communication apparatus. The input unit is equipped with a plurality of character input keys capable of specifying initial characters of destination names. The display displays information including a destination name for the user to confirm whether it is the destination the user needs. After an initial character is specified by striking one of the character input keys, in response to each repeat of the same character input key striking, the controller sequentially retrieves from the memory a destination candidate having as its initial character the character specified by the character input key, and displays it on the display.

BRIEF DESCRIPTION OF THE DRAWINGS

The present invention is further described in the detailed description which follows, with reference to the noted plurality of drawings by way of non-limiting examples of exemplary embodiments of the present invention, in which like reference numerals represent similar parts throughout the several views of the drawings, and wherein:

FIG. 3 shows phonebook data stored in the memory of the multifunction apparatus shown in FIG. 1;

DETAILED DESCRIPTION OF PREFERRED EMBODIMENTS

The embodiments of the present invention are explained in the following in reference to the above-described drawings.

First Embodiment

Figure 1:
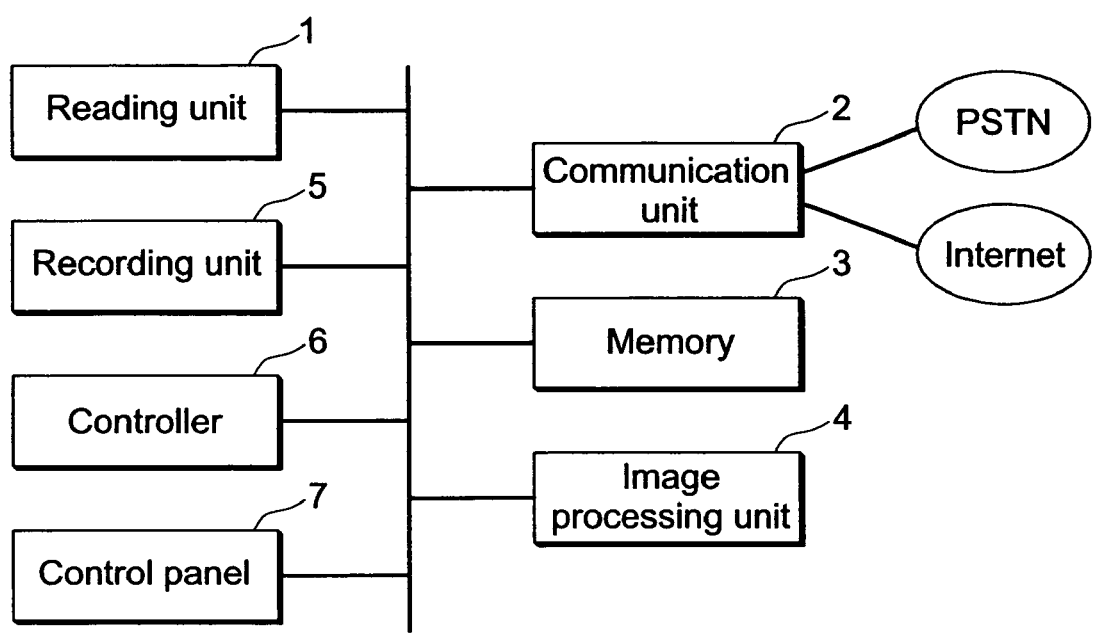
FIG. 1 is a block diagram showing an outline configuration of the multifunction apparatus to which the present invention is applied.

FIG. 1 is a block diagram showing an outline configuration of the multifunction apparatus to which the present invention is applied. The multifunction apparatus includes reading unit 1, communication unit 2, memory 3, image processing unit 4, recording unit 5, controller 6 and control panel 7. Reading unit 1 reads in images of documents. Communication unit 2 performs transmission/reception of image data to/from an apparatus with which the multifunction apparatus communicates. Memory 3 stores image data and information about the settings of the multifunction apparatus. Image processing unit 4 performs necessary image processing (image composition, reduction, rotation, and the like) to the image data. Recording unit 5 prints out the image data. Controller 6 controls the operations of every component of the multifunction apparatus. Control panel 7 is configured with keys and the like for commanding executions of various processes and for inputting various items related to the settings of the multifunction apparatus.

The multifunction apparatus includes a facsimile function, a copy function, a printer function and a scanner function. Read-in image data created by the reading of reading unit 1 is transmitted from communication unit 2, and reception image data received at communication unit 2 are printed out from recording unit 5; thereby the facsimile function is achieved. The facsimile function includes both the function as a G3 facsimile apparatus that performs transmission/reception of image data according to a G3 facsimile communication procedure via PSTN, and the function as a so-called Internet facsimile apparatus that performs transmission/reception of image data via the Internet by storing image data in an e-mail.

Figure 2:
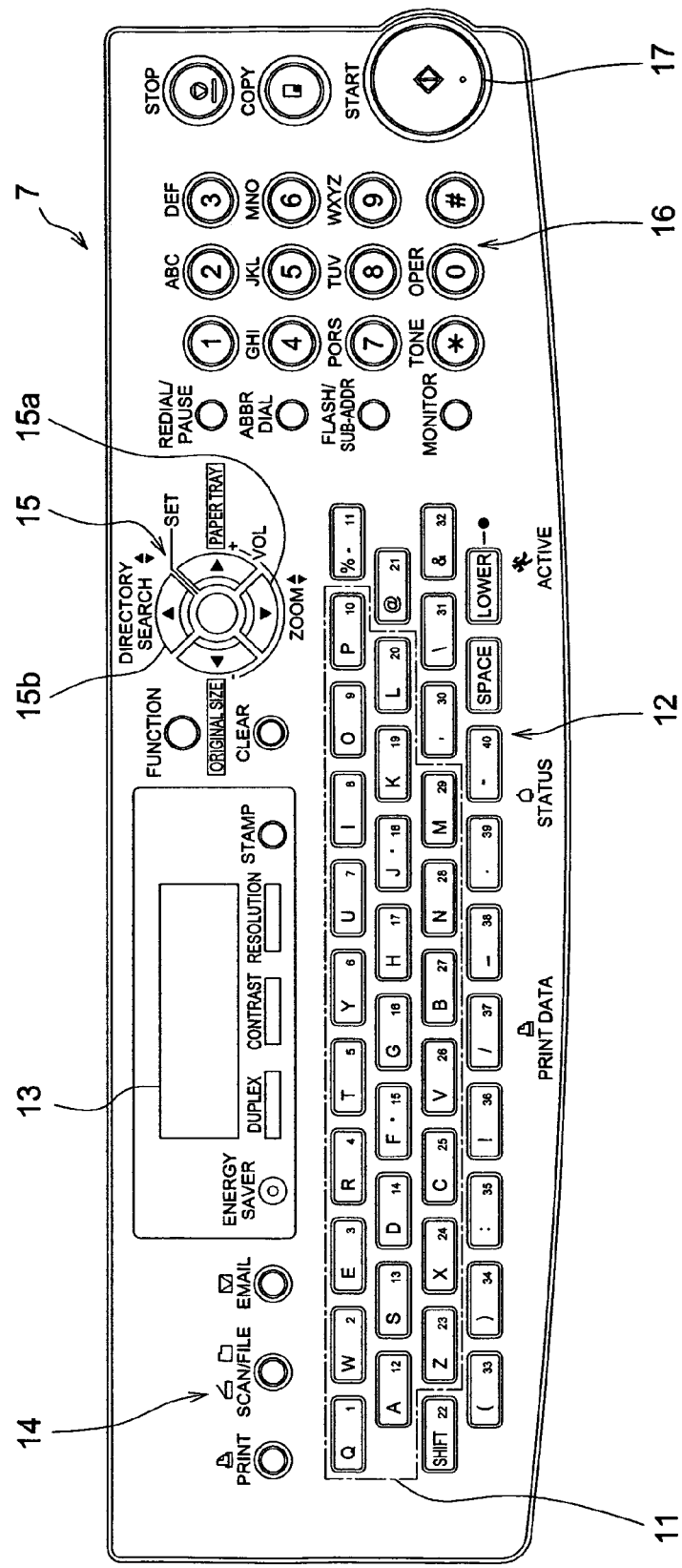
FIG. 2 is a front view showing the external appearance of the control panel of the multifunction apparatus shown in FIG. 1.

FIG. 2 is a front view showing the external appearance of the control panel of the multifunction apparatus shown in FIG. 1. Control panel 7 includes character/symbol input unit 12, display 13, selection keys 14, directory search key 15, numerical keys 16, start key 17, and the like. Character/symbol input keys 12 includes character input keys 11 consisting a plurality of English letter input keys (A-Z) and symbol input keys (".", "-", "@") and the like. Display 13 displays the status of and data stored in the apparatus. Selection keys 14 is used for selecting a function such as the printer, scanner, or Internet facsimile function. Directory search key 15 is equipped with Up/Down/Left/Right arrow keys and is in the form of a multi-cursor key. Numerical keys 16 includes numerical input keys (0-9) and the like for inputting dial numbers. Start key 17 is used to initiate executions of various processes such as facsimile transmission and copy.

The English letter input keys of character input keys 11 are arranged in the usual way for arranging English letter input keys; in other words, they are arranged according to the QWERTY arrangement rules. By using these English letter input keys and the other keys of character/symbol input unit 12 and also the keys of numerical keys 16, it is possible to input destination names in English, dial numbers and e-mail addresses when registering destinations.

FIG. 3 shows the phonebook data stored in the memory of the multifunction apparatus shown in FIG. 1. Memory 3 stores the phonebook data which include a destination name and a dial number or an e-mail address for each destination, registered through the destination registration process. The dial number is used in the case of a G3 facsimile communication, and the e-mail address is used in the case of an Internet facsimile communication in which image data are transmitted as e-mails.

Memory 3 further stores information regarding the listing order for those destinations having the same character as their initial characters. The listing order information is the same as the arrangement rules used in a general dictionary; it is based on the characters following the initial character, that is, the characters including and after the second character in the character string that forms a destination name. For example, among the destinations having "A" as their initial characters, the listing order is determined by alphabetical order of the second characters in the character strings of the destination names ("B" of "ABC CORPORATION", "M" of "AMANDO", "N" of "ANDO TARO"). The ordering process with regard to the listing order can be performed, for example, at the time when the destination names are registered.

Figure 4:
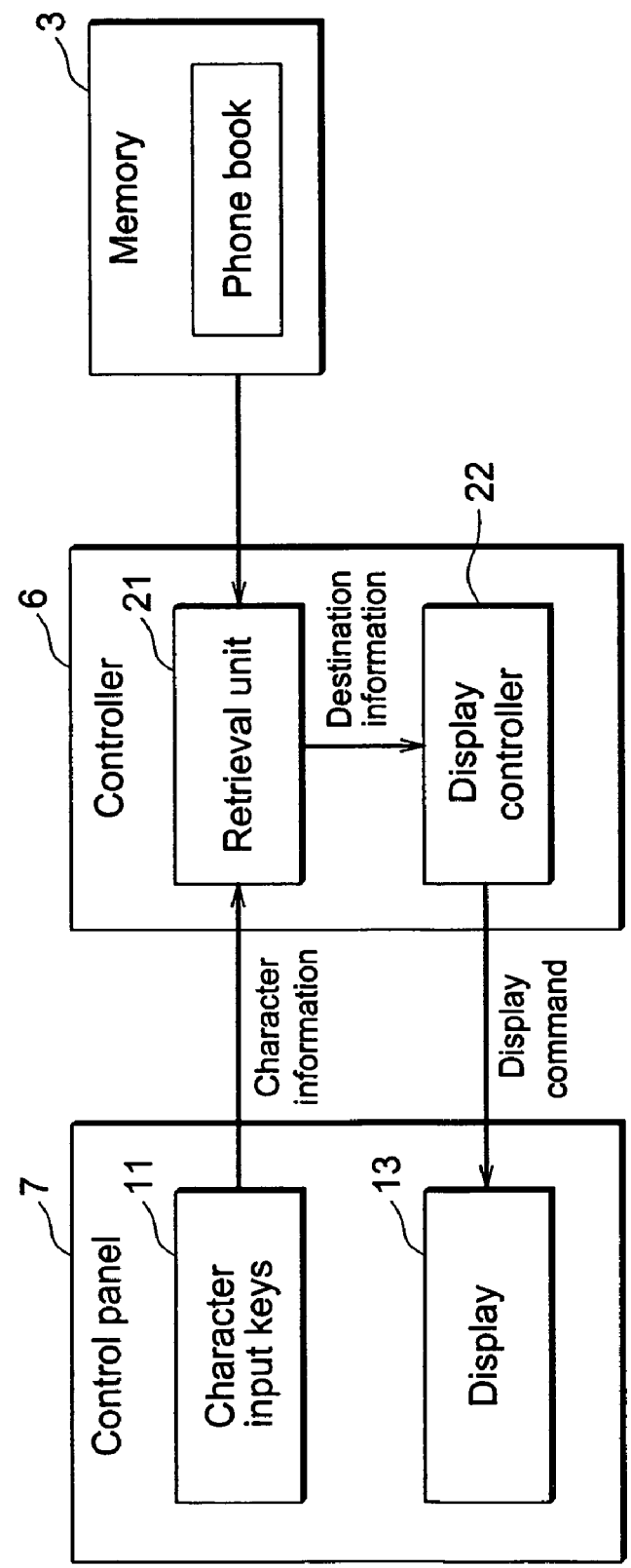
FIG. 4 is a block diagram showing in detail the major components of the multifunction apparatus shown in FIG. 1.

FIG. 4 is a block diagram showing in detail the major components of the multifunction apparatus shown in FIG. 1. Controller 6 includes retrieval unit 21 and display controller 22. Retrieval unit 21 retrieves from the phonebook of memory 3 the information about the destination corresponding to the search condition inputted by using the keys on control panel 7. Display controller 22 controls display 13 so as to display on display 13 the destination information obtained by retrieval unit 21. In particular, in the current case, a user specifies an initial character of a destination name by using an English letter input key of character input keys 11; the process of retrieving destinations having the specified character as their initial characters is performed at retrieval unit 21.

When there is only one destination having the specified character as its initial character, the information about this destination is displayed on display 13. On the other hand, when there are a plurality of destinations having the specified character as their initial characters, information about the first destination according to the listing order is first displayed on display 13, the listing order being specified according to the arrangement rules specified in the way described above (it is the alphabetical order in the current case). After this, for each repeat of the same character input key striking, information about the next destination having the same initial character is displayed sequentially on display 13 according to the listing order.

Figure 5:
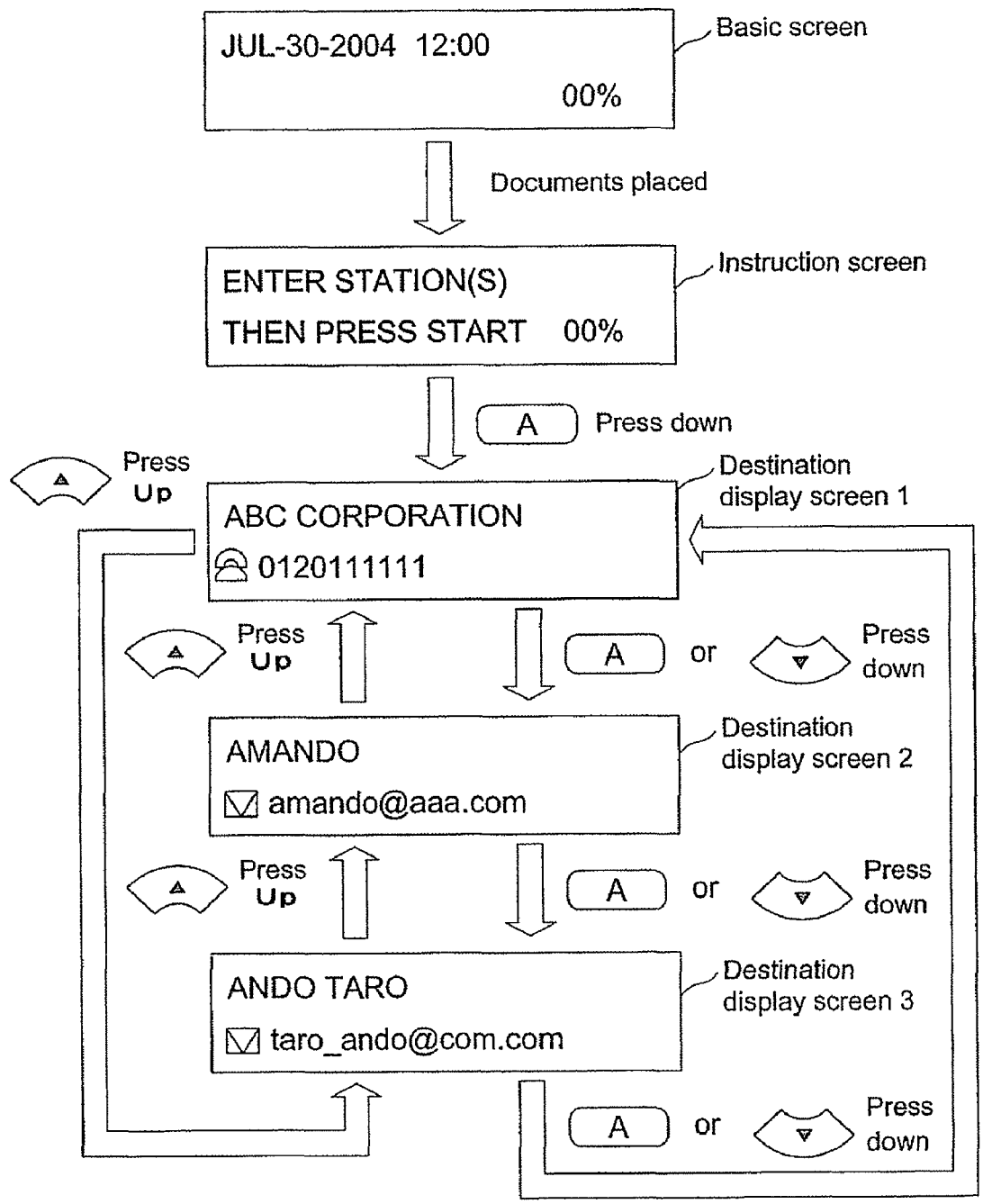
FIG. 5 shows an example of the screen displayed on the display of the control panel of the multifunction apparatus shown in FIG. 1.

FIG. 5 shows an example of the screen displayed on the display of the control panel of the multifunction apparatus shown in FIG. 1. Display 13 displays information about a destination obtained by retrieval unit 21 of controller 6; the displayed information includes a destination name, a dial number or an e-mail address, and an icon, the icon being for the purpose of showing the distinction between a dial number and an e-mail address. A user can look at the information and confirm whether the destination is what he/she needs. When the destination is not what the user needs, the next candidate for the destination can be sequentially displayed on display 13 by repeating the same character input key striking.

In the current example, in the initial state of the facsimile transmission mode, the basic screen is first displayed on display 13. When documents are placed on reading unit 1, the instruction screen is displayed, prompting the user to specify a destination, and the apparatus is switched into the destination specification mode. In the destination specification mode, the apparatus is ready to respond to a character input key striking for specifying an initial character for a destination. When a user strikes the "A" character input key, destination display screen 1 (destination: "ABC CORPORATION") regarding the first destination among the destinations having "A" as their initial characters, is displayed. After this, in response to each striking of the same "A" character input key by the user, a destination display screen, such as destination display screens 2 and 3, regarding the next destination is sequentially displayed.

Furthermore, in this example, when there is no more next destination having the character specified by the character input key as its initial character, the turn goes back to the first destination among the destinations having the same character as their initial characters, and the information regarding the first destination is displayed on display 13.

In the current example, when destination display screen 3 (destination: "ANDO TARO") is displayed by repeatedly striking the "A" character input key, there is no more next destination having "A" as its initial character. Then, in response to an "A" character input key striking, the first destination among the destinations having "A" as their initial characters is retrieved by retrieval unit 21, and destination display screen 1 (destination: "ABC CORPORATION") is displayed.

In the current example, after a user displayed a destination display screen by striking the "A" character input key, it is also possible to proceed to displaying the next destination candidate by striking Down key 15a of directory search key 15, same as in the case of striking the "A" character input key. Further, by striking Up key 15b of directory search key 15, it is possible to display a destination candidate in an order that is opposite to the one in the case of striking a character input key. It is also possible to perform destination retrieval by using these keys together.

Figure 6:
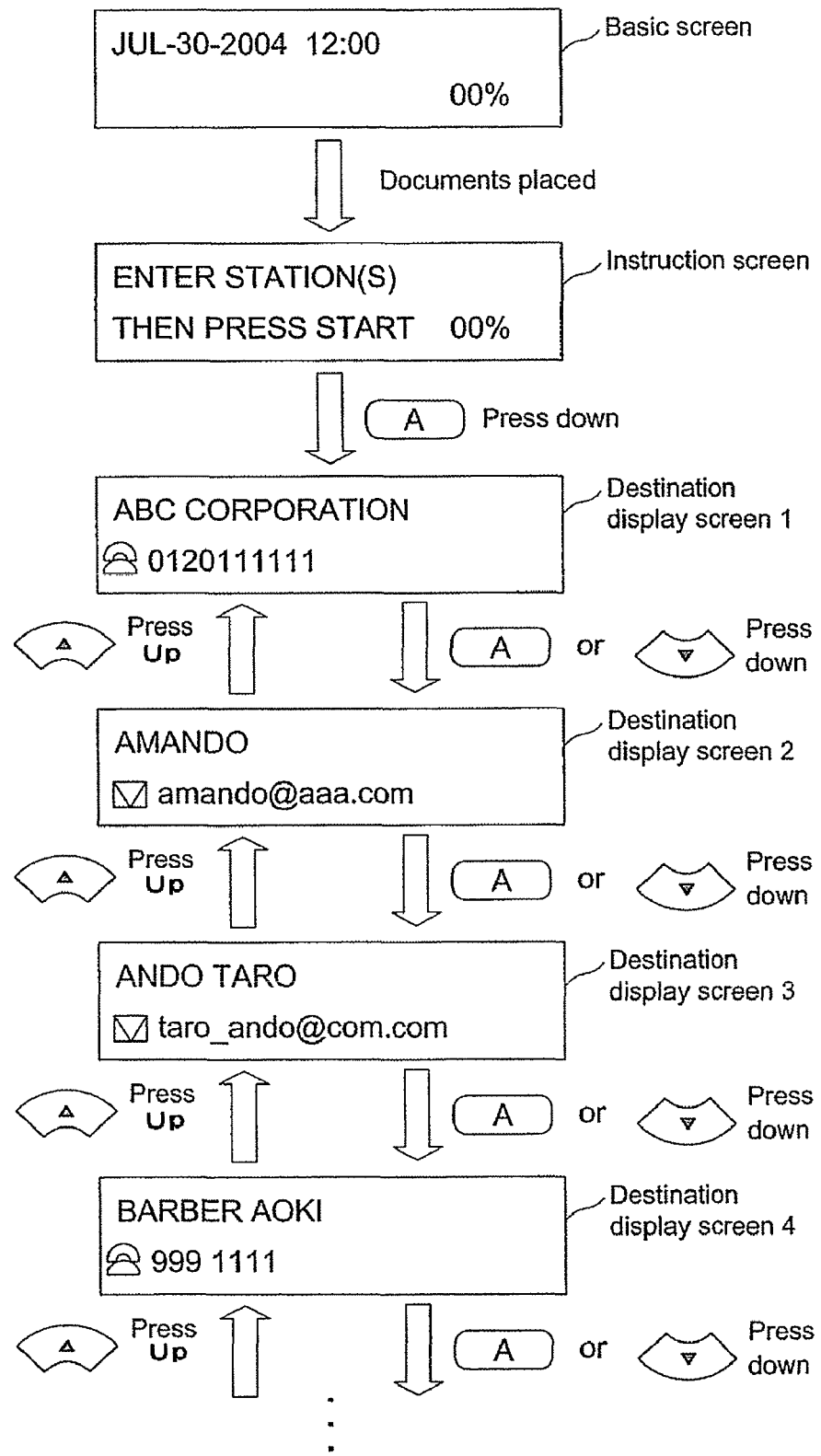
FIG. 6 shows a different example of the screen displayed on the display of the control panel of the multifunction apparatus shown in FIG. 1.

FIG. 6 shows a different example of the screen displayed on the display of the control panel of the multifunction apparatus shown in FIG. 1. In this example, same as in the previous example, it is possible to sequentially display on display 13 the next destination candidate by repeating the same character input key striking. However, different from the previous example, when there is no more next destination having the character specified by the character input key as its initial character, the initial character, which is used as the search condition in the process of narrowing down the number of candidates, is changed to the next character after the character specified by the character input key, according to the predetermined arrangement rules, and the destination retrieval process is continued.

Specifically, after documents are placed on reading unit 1, when a user strikes the "A" character input key, same as in the previous example, the information for the first destination among the destinations having "A" as their initial characters, is displayed first. After this, in response to each striking of the same "A" character input key, information for the next destination is sequentially displayed. When destination display screen 3 (destination: "ANDO TARO") is displayed, there is no more next destination among the destinations having "A" as their initial characters. Then, in response to a striking of the "A" character input key, the first destination among the destinations having "B" (the next character after "A" according to the alphabetical order) as their initial characters is retrieved and the corresponding destination information is displayed on display 13 in the way shown by destination display screen 4 (destination: "BARBER AOKI").

In the current case, same as in the previous example, after a user displayed a destination display screen by striking the "A" character input key, it is also possible to display the next destination candidate by striking Down key 15a of directory search key 15, same as in the case of striking the "A" character input key. And, by striking Up key 15b of directory search key 15, it is possible to display destination candidate in a reversed order. Further, after it has proceeded to displaying a destination of initial character "B", it is also possible to return to displaying a destination of initial character "A" by striking Up key 15b of directory search key 15.

As explained above, there are two destination retrieval modes that a user can select according to his/her convenience. One destination retrieval mode is the repetitive retrieval mode, as shown in FIG. 5, in which, when there is no more destination as the next candidate, the turn of retrieval returns to the first destination and the destination retrieval process is continued. The other destination retrieval mode is the condition-change retrieval mode, as shown in FIG. 6, in which, when there is no more destination as the next candidate, the search condition is changed to the next character and the destination retrieval process is continued.

As described above, by striking a required character input key, a user displays on display 13 the information about a destination that he/she needs. While the display screen for the destination is being displayed, by striking start key 17, the user selects the destination as the one he/she needs and initiates a transmission process. Specifically, when the destination information obtained at retrieval unit 21 of controller 6 is a dial number, a calling process using the dial number is performed at communication unit 2; the process of transmitting read-in image data is performed according to a G3 facsimile communication procedure. When the destination information is an e-mail address, an e-mail that includes read-in image data and is specified with the e-mail address is created, and a process of transmitting the e-mail to the Internet is performed.

Figure 7:
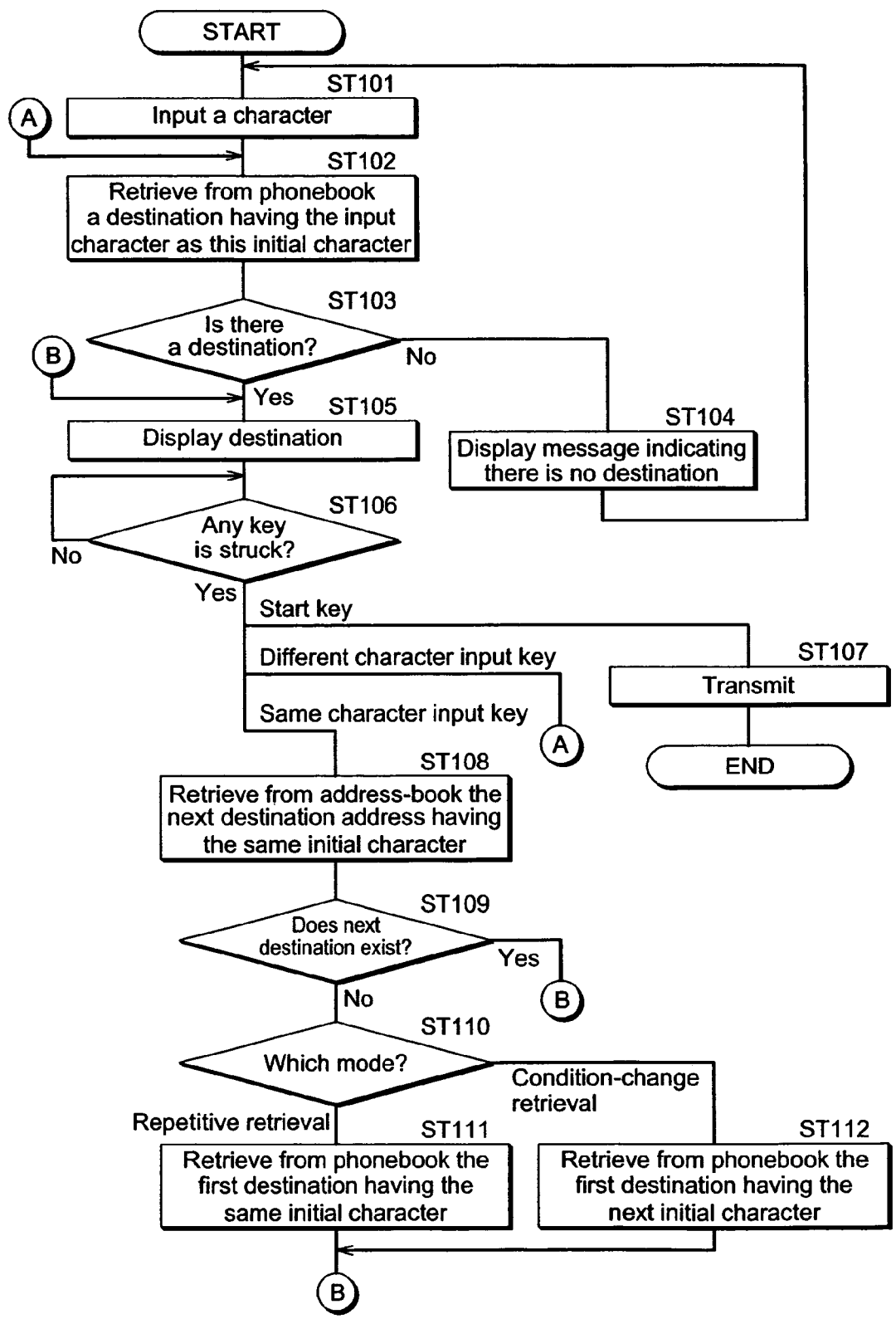
FIG. 7 is a flow chart showing the steps involved in the facsimile transmission process of the multifunction apparatus shown in FIG. 1.

FIG. 7 is a flow chart showing the steps involved in the facsimile transmission process of the multifunction apparatus shown in FIG. 1. When documents are placed on reading unit 1, the multifunction apparatus is switched into the destination specification mode. In the destination specification mode, the apparatus is ready to respond to a character input key striking for specifying an initial character for a destination. In step 101, a user strikes a required character input key. Then, in step 102, a process is performed at retrieval unit 21 of controller 6 to retrieve, from the phonebook of memory 3, the first destination among the destinations having the character specified by the character input key as their initial characters.

Then, in step 103, it is determined whether there exists a destination having the character specified by the character input key as its initial character. When it is determined that there does not exist such a destination, the procedure proceeds to step 104, in which a process is performed displaying on display 13 a text message indicating such a destination is not found. Here, when there is no more suitable next destination, it is also possible to display a destination candidate by changing the initial character to the character that comes after the character specified by the character input key.

On the other hand, when it is determined in step 103 that there is a suitable destination, the procedure proceeds to step 105, in which a process is performed displaying on display 13 the destination information obtained at retrieval unit 21 in step 102. Here, the user confirms whether the destination name displayed on display 13 is what he/she needs. When it is what he/she needs, the user strikes start key 17; when it is a different destination, the user continues to strike the same character input key. And, when it is realized by looking at the destination name displayed on display 13 that a mistake has been made in specifying the initial character, the user strikes a different character input key corresponding to the correct initial character.

Then, when it is determined in step 106 that the user has struck start key 17, the destination displayed on display 13 is selected as the destination (that the user needs) and the procedure proceeds to step 107, in which the process of transmitting facsimile to the specified destination is started. In other words, a process is performed at reading unit 1 to read in images of the documents, after which a process is performed to transmit the read-in image data according to either the G3 or the Internet facsimile transmission procedure.

And, in step 106, when it is determined that the character input key that the user struck is different from the character input key in step 101, the character specified by the character input key that the user struck is used as the initial character, and the destination retrieval process is repeated. Specifically, the procedure returns to step 102, and a destination retrieval process is performed at retrieval unit 21 using the character specified by the character input key that the user struck in step 106 as the initial character.

On the other hand, in step 106, when it is determined that the user has struck the same character input key, the procedure proceeds to step 108, in which a process is performed at retrieval unit 21 of controller 6 to retrieve the next destination having the same initial character. Then, when it is determined in step 109 that there exists the next destination having the character specified by the character input key as its initial character, the procedure returns to step 105, and information about the destination obtained at retrieval unit 21 in step 108 is displayed on display 13.

On the other hand, when it is determined in step 109 that there does not exist the next destination having the character specified by the character input key as its initial character, the procedure proceeds to step 110, in which it is determined whether the setup is for a repetitive retrieval or a condition-change retrieval. Here a repetitive retrieval means that, as shown in FIG. 5, the retrieval process is repeated, from the beginning, with the same initial character as the one specified by the character input key, the initial character being used as the search condition in the process of narrowing down the number of destination candidates. The condition-change retrieval means that, as shown in FIG. 6, the retrieval process is continued by changing the initial character to the next character according to the pre-determined order (here it is the alphabetical order), the initial character being used as the search condition in the process of narrowing down the number of destination candidates.

When it is determined in step 110 that the setup is for a repetitive retrieval, the procedure proceeds to step 111, in which a process is performed at retrieval unit 21 to retrieve from the phonebook of memory 3 the first destination among those having the character specified by the character input key as their initial characters. The procedure then returns to step 105, in which a process is performed to display on display 13 the information for the destination obtained at retrieval unit 21 in step 111. On the other hand, when it is determined in step 110 that the setup is for a condition-change retrieval, the procedure proceeds to step 112, in which a process is performed at retrieval unit 21 to retrieve from the phonebook of memory 3 the first destination among those having as their initial characters the character that comes after the one specified by the character input key. The procedure then returns to step 105, in which a process is performed to display on display 13 the information for the destination obtained at retrieval unit 21 in step 112.

Figure 8:
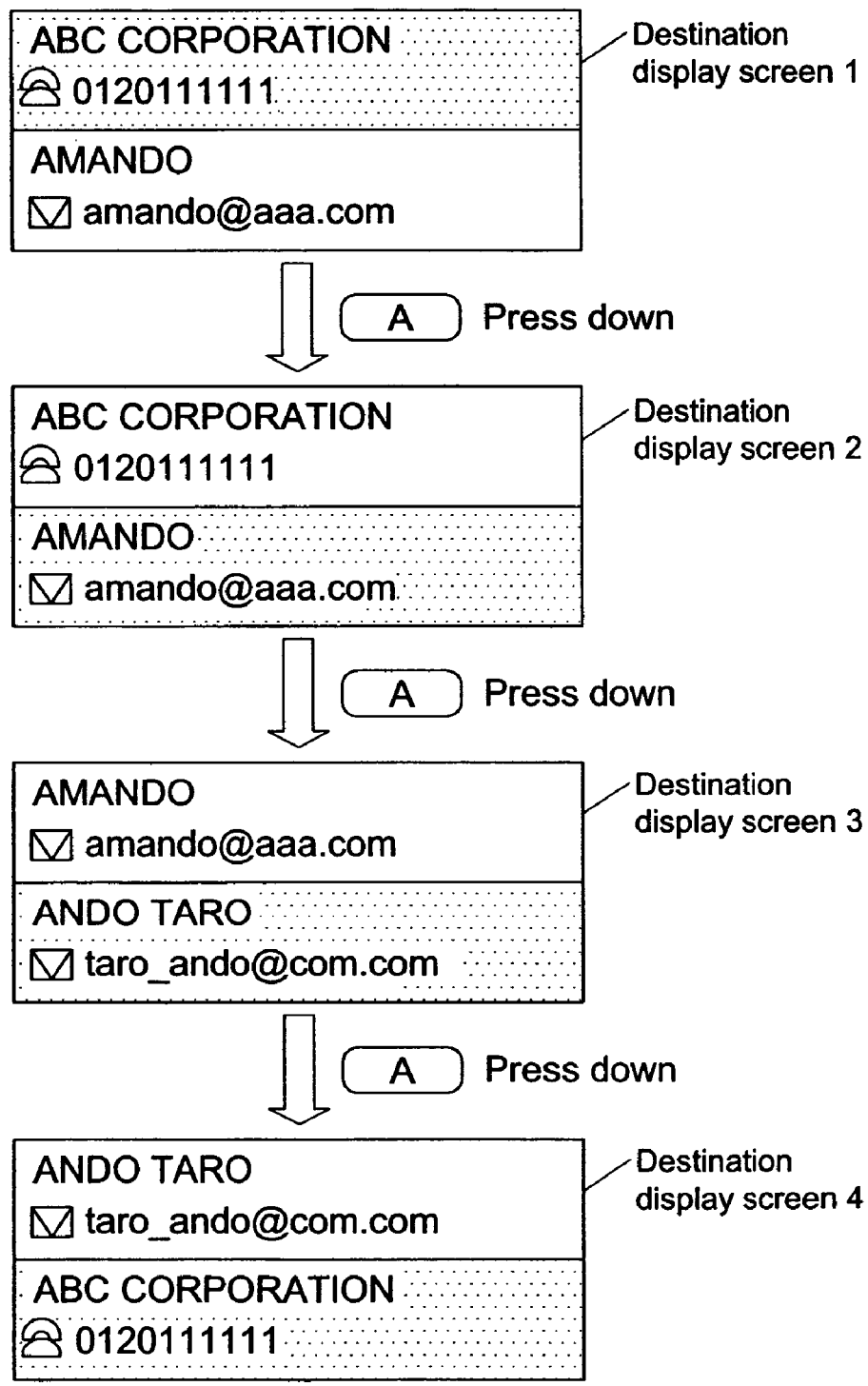
FIG. 8 shows a different example of the screen displayed on the display of the control panel of the multifunction apparatus shown in FIG. 1.

FIG. 8 shows a different example of the screen displayed on the display of the control panel of the multifunction apparatus shown in FIG. 1. Here, display 13 has a relatively larger screen that can display a plurality of destination candidates. In response to each striking of a character input key, the screen scrolls and the next candidate is displayed. A destination candidate in the selected mode, in which the destination candidate is selectable, is made distinguishable from other candidates by displaying it as a reversing-display.

In the current example, same as in the examples shown in FIGS. 5 and 6, after documents are placed on reading unit 1 in the facsimile transmission mode, destination display screen 1 is displayed by striking a character input key for specifying an initial character for a destination. In this screen, the first destination candidate ("ABC CORPORATION") is in the selected mode and is displayed as a reversing-display. When the user strikes the same character input key again, destination display screen 2 is displayed, in which the next destination candidate (AMANDO) is in the selected mode and displayed as a reversing-display. When the user strikes the same character input key again, the screen scrolls upwards and the next destination candidate (ANDO TARO) is displayed.

Here, when the user further strikes the same character input key again, the screen scrolls upwards, however, when there is no more next destination candidate having the character specified by the character input key as its initial character, the turn goes back to the first destination, same as in the example shown in FIG. 5, and destination display screen 4 is displayed, in which following the last destination candidate (ANDO TARO), the first destination candidate (ABC CORPORATION) is in the selected mode and displayed as a reversing-display.

When there is no more next destination candidate having as its initial character the character specified by the character input key, same as in the example shown in FIG. 6, it may also let the turn go to the first destination candidate having as its initial character the next character according to the alphabetical order. In this case, following the last destination candidate (ANDO TARO) having the specified character as its initial character, the first destination candidate (BARBER AOKI) having the next character as its initial character is displayed.

Furthermore, same as in the examples shown in FIGS. 5 and 6, it is also possible in this configuration to proceed to the next destination candidate by striking Down key 15a of directory search key 15, same as in the case of striking a character input key. Further, by striking Up key 15b of directory search key 15, it is possible to return to displaying a previously displayed destination candidate, in an opposite order as in the case of striking a character input key.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

This application is based on the Japanese Patent Application No. 2004-339818 filed on Nov. 25, 2004, entire content of which is expressly incorporated by reference herein.

What is claimed is:

1. A multifunctional apparatus including a facsimile function, comprising:
- a memory configured to store a plurality of information each utilized for connecting to a destination and a plurality of destination names respectively corresponding to the plurality of the information;
- a panel that has a plurality of input keys for inputting a name of a destination and a search key including at least one of an UP key and a DOWN key;
- a display configured to display the name of the destination; and
- a controller configured, when a first character of the destination name is input by one of the plurality of the input keys, to retrieve, from the memory, one destination name having, as a first character, the character input by the one of the plurality of the input keys, and to display the retrieved one destination name on the display,
- the controller further configured, when the search key is actuated after a first character of the destination name is input by one of the plurality of the input keys, to retrieve, from the memory, another destination name having, as a first character, the character input by the one of the plurality of the input keys based on an instruction by the search key, and to display the retrieved another destination name on the display, and
- when, instead of the search key, after the first character is input, a same input key as the input key utilized for inputting the first character of the destination name is again actuated, the controller is further configured to retrieve, from the memory, the another destination name having, as a first character, the character input by the one of the plurality of the input keys based on an instruction by the same input key, and to display the retrieved another destination name on the display,
- wherein the retrieved one destination name or the another destination name and the plurality of information are used by the facsimile function to connect to a destination that corresponds to the retrieved one destination name, or the retrieved another destination name,
- wherein the controller retrieves one destination name having an other first character from the memory, based on a predetermined order, when the same input key as the input key utilized for inputting the first character of the destination name is again actuated and when the one destination name having the same first character is not stored in the memory.

2. The multifunctional apparatus according to claim 1, wherein the plurality of the input keys comprise alphabet keys.

3. The multifunctional apparatus according to claim 1, wherein the display is configured to display a single destination name.

4. The multifunctional apparatus according to claim 1, wherein the controller retrieves the one destination name and the another destination name from the memory, based on the predetermined order.

5. The multifunctional apparatus according to claim 4, wherein the predetermined order comprises alphabetical order.

6. The multifunctional apparatus according to claim 1, wherein the predetermined order comprises alphabetical order.

7. The multifunctional apparatus according to claim 1, wherein the plurality of information utilized for connecting to the destination comprises a telephone number of the destination.

8. The destination retrieving apparatus according to claim 1, wherein the plurality of information utilized for connecting to the destination comprises an electronic mail address of the destination.

9. The multifunctional apparatus according to claim 1, wherein the plurality of information utilized for connecting to the destination include at least one of a telephone number and an electronic mail address for each of the plurality of destination names stored in the memory.

10. The multifunctional apparatus according to claim 9, wherein the telephone number is used for a digital facsimile communication, and the electronic mail address is used for an Internet facsimile communication in which image data is transmitted via electronic mail.

11. The multifunctional apparatus according to claim 1, wherein the multifunctional apparatus includes two user-selectable destination retrieval modes.

12. A multifunctional apparatus including a facsimile function, comprising:
- a memory configured to store a plurality of information each utilized for connecting to a destination and a plurality of destination names corresponding to the plurality of the information;
- a panel that has a plurality of input keys for inputting a name of a destination;
- a display configured to display the name of the destination; and
- a controller configured, when a first character of the destination name is input by one of the plurality of the input keys, to retrieve, from the memory, one destination name having, as a first character, the character input by the one of the plurality of the input keys, and to display the retrieved one destination name on the display,
- the controller, when the same input key as the input key utilized for inputting the first character of the destination name is again actuated, being further configured to retrieve an other destination name having the same first character from the memory, and to display the retrieved other destination name on the display,
- wherein at least one retrieved destination name and the plurality of information are used by the facsimile function to connect to a destination that corresponds to the at least one retrieved destination name,
- wherein the multifunctional apparatus includes two user-selectable destination retrieval modes,
- wherein the two user-selectable destination retrieval modes includes a repetitive retrieval mode, in which when there are no more destination names as the other destination name, the retrieval returns to the one destination name, and
- a condition-change retrieval mode, in which when there are no more destination names as the other destination name, a search condition is changed to a next character, and the retrieval of destination names continues.

13. The multifunction apparatus according to claim 1, wherein, after the first character is input, instead of the actuation of the search key, an other character is input by actuating an input key, which is different from the input key utilized for inputting the first character, the controller is further configured to retrieve a destination name having the other character as a first character from the memory, and to display the retrieved destination name having the other character as the first character on the display.

14. The multi-function apparatus according to claim 1, wherein, when the same input key as the input key utilized for inputting the first character of the destination name is again actuated, the another destination name is retrieved, regardless of whether or not the second character of the other destination name corresponds to the character input by the same input key.

* * * * *